(12) United States Patent
Malloy et al.

(10) Patent No.: US 9,323,555 B2
(45) Date of Patent: *Apr. 26, 2016

(54) CORRECTING PACKET TIMESTAMPS IN VIRTUALIZED ENVIRONMENTS

(71) Applicant: Riverbed Technology, Inc., San Francisco, CA (US)

(72) Inventors: Patrick J. Malloy, Washington, DC (US); Alexey Shakula, Reston, VA (US); Ryan Gehl, Silver Spring, MD (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/073,865

(22) Filed: Nov. 7, 2013

(65) Prior Publication Data

US 2014/0068615 A1 Mar. 6, 2014

Related U.S. Application Data

(63) Continuation of application No. 13/021,709, filed on Feb. 4, 2011, now Pat. No. 8,607,229.

(60) Provisional application No. 61/301,803, filed on Feb. 5, 2010.

(51) Int. Cl.
*G06F 9/455* (2006.01)

(52) U.S. Cl.
CPC ........ *G06F 9/45533* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

2004/0143592 A1* 7/2004 Jung .............................. 707/102
2012/0304175 A1* 11/2012 Damola et al. .................... 718/1

* cited by examiner

*Primary Examiner* — Sulaiman Nooristany
(74) *Attorney, Agent, or Firm* — Park, Vaughan, Fleming & Dowler LLP; Laxman Sahasrabuddhe

(57) ABSTRACT

A network capture element is embodied on a virtual machine, and a utility function is embodied on the actual device, preferably within the virtual machine manager. Both the utility function and the traffic capture element are configured to monitor communication events. To minimize the overhead imposed, the utility function is configured to merely store the time that the event occurred on the actual machine, corresponding to an identifier of the event. The network capture element, on the other hand, performs the time consuming tasks of filtering the communications, selectively storing some or all of the data content of the communications, characterizing the data content, and so on. Instead of storing the virtual time that the communication event occurred at the virtual machine, the network capture element uses the identifier of the communication event to retrieve the actual time that the communication event occurred on the actual machine.

20 Claims, 2 Drawing Sheets

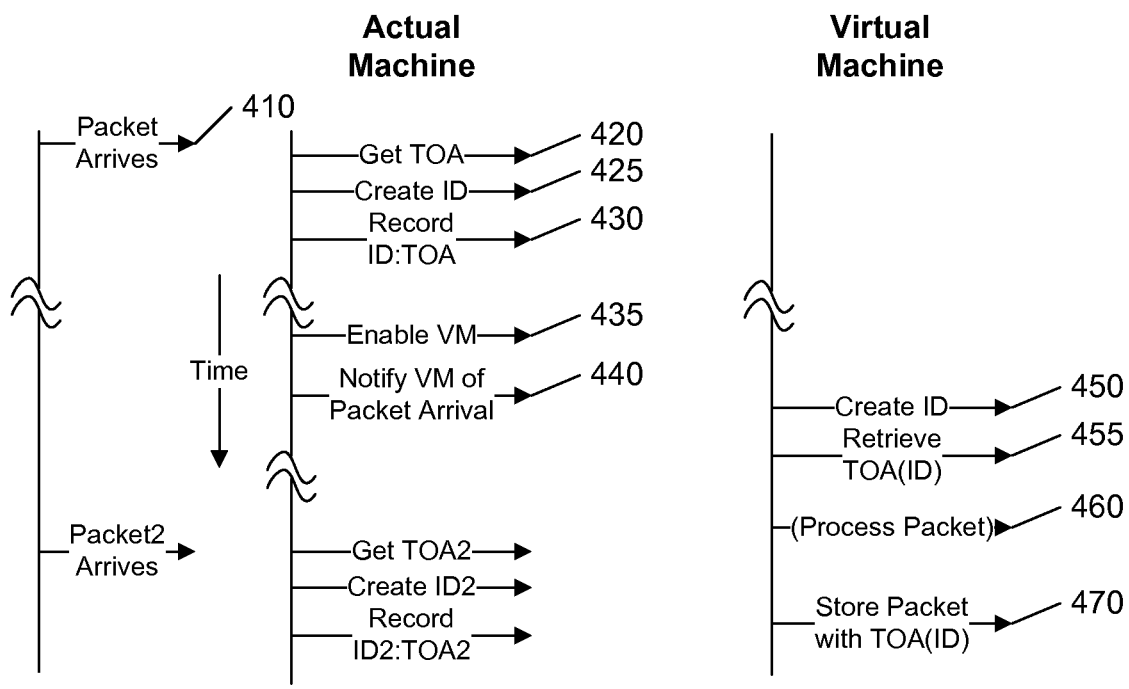
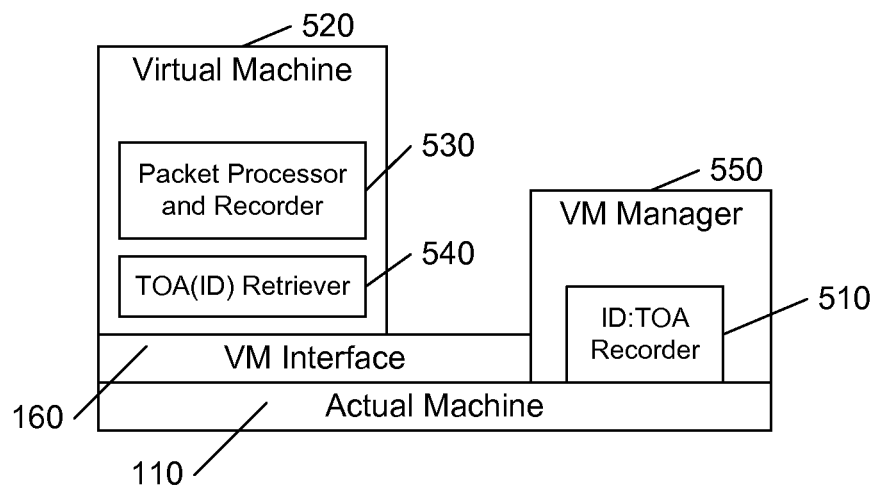

CORRECTING PACKET TIMESTAMPS IN VIRTUALIZED ENVIRONMENTS

This application is a continuation of U.S. Patent Application 13/021,709, filed 4 Feb. 2011, which claims the benefit of U.S. Provisional Patent Application 61/301,803, filed 5 Feb. 2010.

BACKGROUND AND SUMMARY OF THE INVENTION

This invention relates to the field of network analysis, and in particular to traffic monitoring using a capture system that is embodied on a virtual machine.

The ever-continuing increase in computer processing capabilities has resulted in a resurgence of "Virtual Machines" (VM). In a virtual machine system, such as illustrated in FIG. 1, a single physical/actual machine 110 appears to be multiple machines VM1 120, VM2 130, . . . VMn, that are isolated from each other. In like manner, system resources, such as communication interfaces, memory, and the like, may appear to be allocated solely to each of these virtual machines. This conversion of physical components into an apparent plurality of components is performed by a software layer, typically termed a Virtual Machine Interface 140 between the physical components of the actual machine and the plurality of virtual components. The interface 140 is controlled by a Virtual Machine Manager (VMM) 150 that is preferably configured to be as "thin" as possible, imposing minimal overhead burden on the individual virtual machines.

In the field of network analysis, traffic capture elements generally record the time that each communications event occurs, such as the time that each packet is seen by the traffic capture element. By placing traffic capture elements at a variety of locations within a network, performance parameters, such as propagation delays, congestion delays, processing delays, etc. can be determined. The proximity of a traffic capture element to a particular node will affect the analysis that can be performed with respect to that node. If the traffic capture element is remote from the node, the determined performance parameters will be affected by any elements that are between the traffic capture element and the node of interest, and it may be impossible to distinguish the performance attributable to this node. To provide accurate and precise timing parameters, a traffic capture element will often be collocated with each node of interest, preferably embodied on that same node.

Virtual machines are often used for creating a multi-server environment with reduced operational costs, using "server consolidation" techniques. Application servers are often underutilized and idle most of the time, but deployed to accommodate peak demands. By embodying multiple virtual servers on a single actual machine, server consolidation allows the use of a management console to manage the virtual servers with greater ease than if they were running on individual actual machines, and facilitates load-balancing. The smaller number of physical machines also reduces the power, cooling, floor space, etc. of the servers. Additionally, because each virtual machine is isolated from each other, a failure or compromise in one server will not affect the rest of the servers on the machine. Properly configured, a compromised virtual server cannot, for example, effect a denial-of-service attack by consuming an inordinate share of the resources of the actual machine.

Another advantage of a virtual machine embodiment is transportability and independence from the actual machine. In the multi-server application, this allows for the replacement or upgrade of the actual machine with minimal impact on the service being provided, even if the replacement is substantially different from the original actual machine. The virtual machine manager will generally be customized for each type of actual machine (different types of processors, operating systems, etc.) that will host the virtual machine manager, but once this customization is performed, none of the applications that are running on the virtual machines will need to be customized.

In a virtual machine environment, each virtual machine 120, 130 operates independently of each other, and operates as if it were a single, individual machine. Even though the physical machine 110 is being time-shared among the virtual machines 120, 130, the individual virtual machines 120, 130 are unaware of this time-sharing.

Of particular note, each virtual machine 120, 130 is unaware of the gaps in real time as the actual machine 110 services the other virtual machines. As in the actual machine 110, timing is typically accomplished by counting the 'ticks' of a system clock, each tick triggering an interrupt that causes the processor to increment a counter. In a virtual machine system, the actual machine 110 receives the interrupts directly, whereas the virtual machine manager 150 buffers these interrupts and provides them to the virtual machines, via the interface 140, during the intervals that each virtual machine is enabled.

Generally, all interrupts received by the actual machine are provided to the virtual machines, albeit shifted in time by the virtual machine manager. That is, the same number of interrupts are provided to each of the virtual machines as to the actual machine. Accordingly, because the individual virtual machines are regularly 'disconnected' from the actual machine, the timing interrupts will not occur at the uniform rate that the actual timing interrupts occur.

FIG. 2 illustrates an example timing diagram for propagating clocking signals in a virtual machine system with two virtual machines VM1, VM2. As illustrated in FIG. 2, the actual machine receives timing interrupts 210 at a constant rate. However, the individual machines VM1, VM2 are selectively enabled 221, 222, and during the period that a virtual machine is not enabled, the virtual machine will not be notified of the interrupt. That is, for example, during the period 220 immediately before VM1 is enabled 221, some interrupts 210 will occur. To assure that each of the virtual machines receives all of the interrupts 210, the virtual machine manager includes an interrupt 'buffer' that records the occurrence of each interrupt.

When a particular virtual machine is enabled, the timing interrupts that had occurred while this machine was not enabled will be provided to the virtual machine from the virtual machine manager at a faster rate than the rate of actual timing interrupts. Eventually, there will be no interrupts in the buffer, and subsequent interrupts will be provided to the enabled virtual machine as they occur on the actual machine. As illustrated in FIG. 2, when VM1 is enabled, it initially receives interrupts 230 at a rate faster than the rate of interrupts 210 until all of the buffered interrupts are received, then receives interrupts 235 at the rate of the interrupts 210. In this manner, the total number of interrupts provided to the virtual machine VM1 while it is enabled is equal to the total number of interrupts that occurred since it was last enabled. In like manner, when VM2 is enabled 222, it receives interrupts 240 at a faster rate than the actual rate that the interrupts 210 occur, then receives interrupts 245 at the rate that subsequent interrupts 210 occur.

Other techniques may be used to provide timing information to each virtual machine, but in general, any system that hides the fact that gaps are occurring in real time as the actual machine is being time shared among the plurality of virtual machines will introduce an artificial time that differs from the actual time. The introduction of an artificial time to each virtual machine to make it appear that the virtual machine is operating just like an actual machine limits the use of virtual machines for applications that require accurate and precise timing measures.

As noted above, traffic capture elements are often preferably placed at server locations, to monitor the performance of each server and the overall performance of the network with regard to such servers. Ideally, if multiple virtual servers are embodied on an actual machine, the traffic capture element would also be embodied on this same actual machine. Unfortunately, the aforementioned use of artificial timing for each virtual machine makes it infeasible, or impractical, to embody the traffic capture element as a virtual machine on the actual machine.

To obtain accurate timing information, the traffic capture element may be embodied directly on the actual machine, with access to the actual timing system for recording the time of occurrence of communication events. However, such an embodiment will likely affect the overall performance of all of the virtual machines, because it would compete with the virtual machine manager for actual system resources, and would need to have priority over these virtual machines in order to accurately determine the time that the communication event occurs.

The traffic capture element may also be embodied within the virtual machine manager, to more efficiently control this competition. However, the embodiment of a traffic capture element within a virtual machine manager would significantly increase the overhead associated with the virtual machine manager, because a traffic capture element will generally be configured to process each monitored packet to record information that may be required for subsequent traffic analysis.

Embodying the traffic capture element within the actual system, inside or outside the virtual machine manager, will also require customizing the traffic capture element for each type of actual machine that can host the virtual machine manager, thereby losing the aforementioned advantages in reduced development time that could be gained by embodying the traffic capture element on a virtual machine.

It would be advantageous to embody a network capture element on an actual device that is hosting a virtual machine manager without substantially interfering with or burdening the virtual machine manager. It would also be advantageous to embody a network capture element on the actual device without having to customize the network capture element for different types of actual devices.

These advantages, and others, can be realized by embodying the network capture element on a virtual machine while avoiding the timing errors and anomalies associated with virtual machines. A utility function that has minimal impact on the actual device or virtual machine manager is embodied on the actual device, preferably within the virtual machine manager. Both the utility function and the traffic capture element are configured to monitor communication events. To minimize the overhead imposed, the utility function is configured to merely store an identifier of the communication event, and the actual time that the event occurred. The network capture element, on the other hand, performs the more complicated and time consuming tasks of filtering the communications, selectively storing some or all of the data content of the communications, characterizing the data content, and so on. Instead of storing the artificial time that the communication event apparently occurred at the network capture element in the virtual machine, the network capture element uses the identifier of the communication event to retrieve the actual time that the communication event occurred at the utility function on the actual machine.

BRIEF DESCRIPTION OF THE DRAWINGS

The invention is explained in further detail, and by way of example, with reference to the accompanying drawings wherein:

FIG. 4 illustrates an example flow diagram for accurately capturing communication events.

FIG. 5 illustrates an example block diagram of a virtual machine system that accurately captures communication events.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention is presented in the context of recording the time of arrival of received packets, although one of skill in the art will recognize that the principles presented herein are not limited to a packet based communication protocol, and the communication events may include events other than the receipt of packets. For example, to measure the time required to transmit a message, the communication events may include the time that the first bit of the message was transmitted and the time that the last bit was transmitted.

Figure 1:
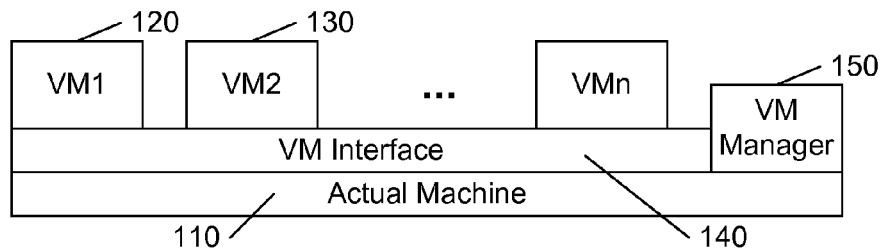
FIG. 1 illustrates an example block diagram of a virtual machine system.
Figure 2:
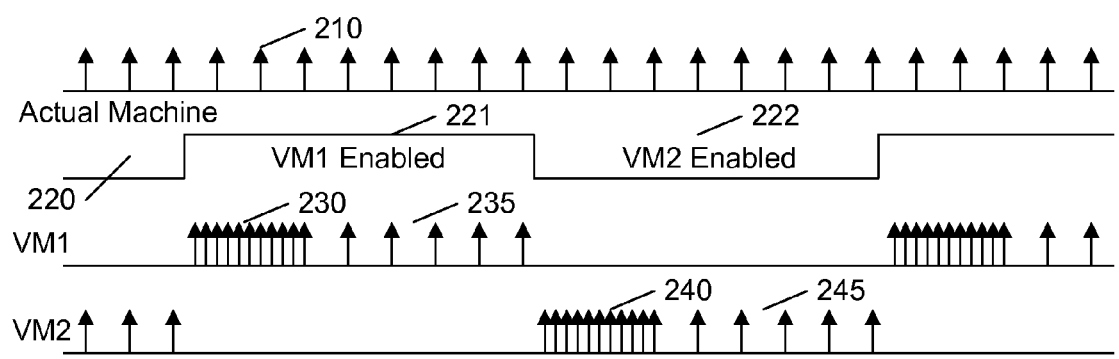
FIG. 2 illustrates an example clock timing diagram in a virtual machine system.
Figure 3:
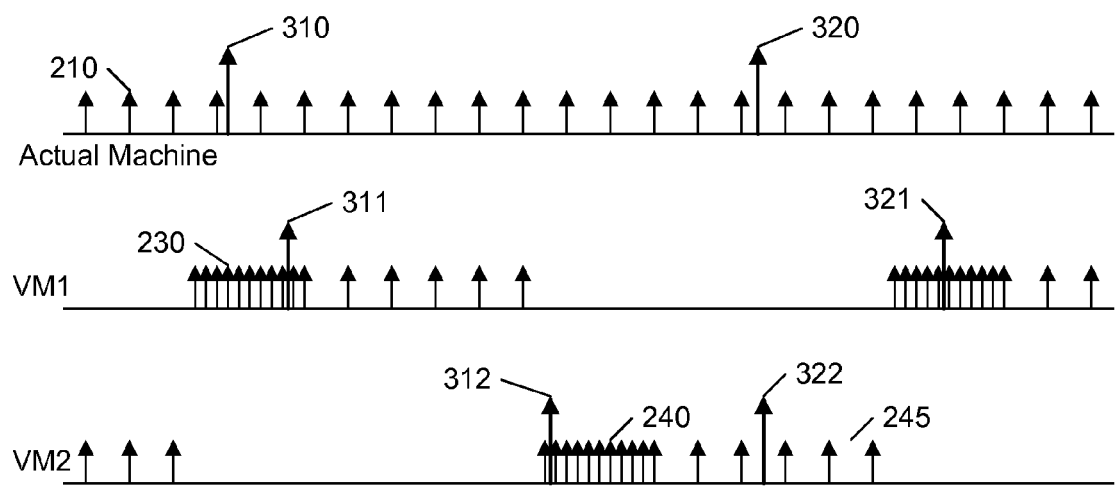
FIG. 3 illustrates an example timing diagram when communication events occur in a virtual machine system.

FIG. 3 illustrates an example timing diagram when communication events 310, 320 occur in a virtual machine system. In this example, both VM1 and VM2 are configured to receive these communication events. For example, one of the virtual machines could be a traffic capture element, and the other virtual machine could be the server that the traffic capture element is configured to monitor.

In the example of FIG. 3, the communication event 310 occurs at the actual machine while VM1 is enabled, and VM2 is disabled. Because VM1 is enabled, the event 310 will be provided to VM1, as event 311, some short time after it is received at the actual machine. However, VM2 will not be notified of the event until after it is enabled, as illustrated by event 312 in FIG. 3. As is clearly evident, neither VM1 nor VM2 will receive the event 311, 312 at the actual time the event 310 occurs, and neither can use their individual clock times to precisely determine when the event 310 occurred.

The timing problem becomes even more apparent as multiple communication events are processed, because the difference between the actual time of occurrence and the apparent time of occurrence (to the virtual machine) is substantially unpredictable. As illustrated in FIG. 3, the next event 320 occurs when VM1 is disabled, and VM2 is enabled. VM2 will receive a corresponding event 322 soon after event 320 occurs, whereas VM1 will not receive its corresponding event 321 until after it is re-enabled. As is clearly evident, a determination of a timing parameter such as received packet rate or inter-packet delay will be substantially different, depending upon whether the parameter is based on the time between the occurrence of events 311 and 321, as seen by VM1, or is based on the time between the occurrence of events 312 and 322, as seen by VM2.

FIG. 4 illustrates an example flow diagram for a virtual machine system that facilitates accurate timing determination for a traffic capture element that is embodied on a virtual machine within this system, and FIG. 5 illustrates an example block diagram of an embodiment to implement this flow. For ease of understanding, the flow diagram of FIG. 4 illustrates the flow when the communication event is the arrival of a packet at the actual machine, or at a device coupled to the actual machine.

As illustrated in FIG. 5, the system includes a recorder 510 coupled to the actual machine 110, preferably within the virtual machine manager 550, because most, if not all, conventional virtual machine managers already include routines for handling/buffering communication events.

As illustrated in FIG. 4, when a packet arrives 410, the recorder 510 on the actual machine determines 420 a time of arrival (TOA), which in most cases is the current clock time on the actual machine. The recorder 510 also creates 425 an identifier (ID) of the packet. As detailed further below, any number of techniques may be used for determining the packet identifier; the only requirement is that this technique should be repeatable at a virtual machine 520. Preferably, the technique is also relatively simple, so as not to impose a significant burden on the actual machine.

The recorder subsequently records 430 the packet identifier and the packet's time of arrival using any number of techniques, the only requirement being that the time of arrival of a packet can be retrieved using the packet identifier. Typically, an array that is indexed by the packet identifier is used to store each time of arrival. This array is preferably maintained in a cache accessible by the recorder, and the recorder is configured to provide the time of arrival from this cache in response to a request that includes the packet identifier. Optionally, the array may be stored in 'external' memory that can be accessed directly by the virtual machine 520.

Of particular note, one of skill in the art will recognize that the creation of a packet identifier and the recording of a time of arrival corresponding to this packet identifier imposes minimal overhead on the actual machine 110, particularly if it is performed by the virtual machine manager 550 during its routine processing/buffering of each communication event on the actual machine 110.

Some time after receipt of the packet, the virtual machine manager 550 will enable 435 virtual machine 520, if it is not already enabled. When the virtual machine 520 is enabled, the virtual machine manager 550 will notify 440 the virtual machine of the packet arrival, typically by emulating the packet's arrival at a virtual port of the virtual machine 520. This notification may be in the form of a virtual interrupt, or in response to an explicit query by the traffic capture element as to whether a new packet has arrived.

A traffic capture element that is embodied on the virtual machine 520 includes a packet processor and recorder 530, and a retriever 540 that is configured to retrieve the time of arrival TOA corresponding to a given packet identifier.

When the virtual machine manager 550 notifies the virtual machine 520 that the packet has arrived, the retriever 540 creates 450 an identifier of the packet, using the same technique that the recorder 510 used to create 425 the original identifier of the packet. Using this packet identifier ID, the retriever 540 retrieves 455 the time of arrival TOA of the packet.

As noted above, the retrieval will be dependent upon the particular embodiment. In the simplest embodiment, the retriever 540 submits a request for the TOA to the recorder 510, typically via a function call that includes the identifier as an argument of the function. In most cases, the virtual machines are provided access to routines and functions provided by the virtual machine manager; accordingly, in addition to the reasons provided above, the recorder 510 is preferably embodied within the virtual machine manager 550. Alternatively, if the times of arrival are stored on an external memory that is accessible by the virtual machine 520, the retriever 540 retrieves the time of arrival from the external memory using techniques common in the art.

The packet processor 530 is configured to process the packet as required to perform its traffic capture function, with the exception that whenever the time of arrival of the packet is referenced, the time of arrival TOA that was retrieved by the retriever 540 for this packet is used, in lieu of the apparent time of arrival at the virtual machine 520. This substitution of the actual TOA for the virtual time of arrival may be performed while the packet is being processed, or as a post-processing operation. Typically, the packet processor 530 is configured to performed functions such as determining packet characteristics such as the source and destination of the packet, the packet length, sequence number, and so on; and determining whether the packet is a 'packet of interest' that is to be further processed or stored, based on these characteristics or others.

Upon completion of processing, the packet processor 530 creates and stores 470 a record of the packet, including the retrieved time of arrival TOA, some or all of the packet characteristics, and some or all of the header information and data content of the packet. Typically, the information is stored in a form and format that is used by traffic analysis systems to determine network performance characteristics based on the recorded times of arrival and other factors.

Of particular note, by recording the time of occurrence of a communication event on the actual machine corresponding to a packet identifier that can be recreated on a virtual machine, each virtual machine can be provided access to this actual time of occurrence, with minimal impact on the actual machine and the other virtual machines.

Any number of techniques may be used to create a packet identifier, the primary requirement being that the identifier will unambiguously identify the proper time of arrival that has been recorded for the packet. The number of recorded times of events, and thus the possibility of an erroneous retrieval, will be dependent upon the maximum number of packets that can be automatically buffered by or for the virtual machines, and the relationship between events at the actual machine and reported events to the virtual machines.

If it is known, for example, that all events at a given port will be reported to each virtual machine associated with the port, a circular buffer can be maintained at the recorder and each of the retrievers. The index to all of the circular buffers are initialized to a common value; the index at the recorder for storing the time of arrival is modulo-incremented with each packet arrival; and the index at the retrievers, identifying where the time of arrival for 'next' packet in the buffer is stored, are modulo-incremented upon receipt of the notification. Thus, an implicit or explicit identification of the port, coupled with the index to the next packet to be processed at a particular virtual machine will serve to correctly identify the time of arrival of that next packet, provided that no notifications are missed, and that the virtual machine will retrieve the time before the recorder receives a number of subsequent packets that exceeds the number of entries in its circular buffer and the time of arrival of the 'old' packet is overwritten by the time of arrival of a 'new' packet.

At the opposite extreme, instead of relying on synchronization between the recorder and each retriever, the header information in a packet is generally sufficiently unique so as to identify a packet regardless of how long ago the packet was received. However, since the typical IPv4 header includes at least 160 bits, an array indexed by the header content would not be feasible, As such, to use the header as the identifier, the recorder would be configured to store both the packet header and the time of arrival. As with the use of a circular buffer, this technique requires minimal processing, but it requires a significant amount of storage per event occurrence. Additionally, the retrieval of the time of arrival will require an explicit search through the stored headers for a match to the current header. Sub-sets of the header may be used to reduce the size of a potential indexed array, or to reduce the search time in a non-indexed storage of the pairs, provided that the sub-set provides a reasonably unique identification of each packet.

In an alternative embodiment, a compromise between processing time and search time or storage space is used. A hash of the packet header, or any other set of bits that are expected to be somewhat unique to a packet, is computed by the recorder, and used as an index to an array of times of arrival (hereinafter, a 'hash table'). The computation of a hash will introduce some processing overhead in the recorder, but a variety of hash computation techniques are commonly available, allowing for the selection of a suitably simple algorithm. The use of a hash-table avoids the need to store the determined hash value, and provides for an immediate retrieval, rather than a search, per se.

The size of the hash table will be dependent upon the 'width' of the computed hash value. An 8-bit hash value provides 256 locations for storing times of arrival; a 16-bit hash value provides 64K locations for storing times of arrival. A hash-table, however, does not necessarily guarantee an unambiguous identification of the proper time of arrival, because two different headers could result in the same hash value, and the header of the later arriving packet will cause the time of arrival of the earlier arriving packet to be overwritten. Techniques are available for providing significantly improved uniqueness, but they generally require that the same hash table, in its entirety, be available at both the recording and retrieving systems (e.g. most require that the same sequence of hash determinations be performed at the recorder and retriever).

It is noted that erroneous times of arrival caused by conflicting hash determinations may often be identified by noting that the retrieved times of arrival should be monotonic. Accordingly, either the retriever or a subsequent processor can be configured to identify non-monotonic reported times, and correct such times using interpolation and other techniques to estimate a likely value for the erroneously reported value. This estimate will not be 'accurate', per se, but, given that the hash value is sufficiently wide to produce relatively few conflicts, the impact of using an estimate instead of the actual time of occurrence for these infrequent occurrences can be expected to be slight.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the determination of the packet identifier is illustrated as being performed at both the recorder and the retriever. If, however, the parameters used to generate the packet identifier corresponding to the recorded time of arrival are known to the retriever, these parameters may be sent to the recorder, and the recorder can determine the identifier and report the time of arrival back to the retriever. For example, if a hash based on the header is used to access a hash-table, the header can be sent in the request to the recorder for the time of arrival, eliminating the need for the retriever to be aware of the details used for accessing the hash-table, and potentially allowing for use of the uniqueness-improvement techniques mentioned above.

These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may include a processor, and software portions may be stored on a non-transient computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

The invention claimed is:

1. A non-transitory computer-readable medium comprising a program that, when executed by a processor, causes the processor to:

receive a packet from a virtual machine manager, the packet including an associated virtual time of arrival, retrieve an actual time of arrival of the packet from a storage element in which the virtual machine manager recorded the actual time of arrival, and replacing the virtual time of arrival with the actual time of arrival;

wherein the processor retrieves the actual time of arrival by one of:
  submitting a request to, and receiving a response from the virtual machine manager; and
  accessing the storage element directly.

2. The medium of claim 1, wherein the program causes the processor to maintain a pointer to a buffer in the storage element, and to retrieve the actual time of arrival from the buffer based on the pointer.

3. The medium of claim 2, wherein the buffer is a circular buffer that is managed by the virtual machine manager.

4. The medium of claim 1, wherein the program causes the processor to determine a packet identifier corresponding to the packet, and to retrieve the actual time of arrival based on the packet identifier.

5. The medium of claim 4, wherein the packet identifier includes a hash value corresponding to some or all of the packet.

6. The medium of claim 5, wherein the hash value corresponds to some or all of a header of the packet.

7. The medium of claim 1, wherein the program causes the processor to submit a request to the virtual machine manager for the actual time of arrival.

8. The medium of claim 7, wherein the request includes a packet identifier of the packet.

9. The medium of claim 8, wherein the packet identifier includes at least a portion of the packet.

10. The medium of claim 9, wherein the packet identifier includes at least a portion of a header of the packet.

11. The medium of claim 9, wherein the packet identifier includes a hash value of at least a portion of the packet.

12. A computer-implemented method, comprising:
  a computer receiving a packet from a virtual machine manager, the packet including an associated virtual time of arrival,
  the computer retrieving an actual time of arrival of the packet from a storage element in which the virtual machine manager recorded the actual time of arrival, and
  the computer replacing the virtual time of arrival with the actual time of arrival;
  wherein the computer retrieves the actual time of arrival by one of:
    submitting a request to, and receiving a response from the virtual machine manager; and
    accessing the storage element directly.

13. The computer-implemented method of claim 12, wherein the method further comprises maintaining a pointer to a buffer in the storage element, and to retrieve the actual time of arrival from the buffer based on the pointer.

14. The computer-implemented method of claim 13, wherein the buffer is a circular buffer that is managed by the virtual machine manager.

15. The computer-implemented method of claim 12, wherein the method further comprises determining a packet identifier corresponding to the packet, and to retrieve the actual time of arrival based on the packet identifier.

16. The computer-implemented method of claim 15, wherein the packet identifier includes a hash value corresponding to some or all of the packet.

17. An apparatus, comprising:
  a processor; and
  a memory storing instructions that, when executed by the processor, cause the apparatus to perform a method, comprising:
    receiving a packet from a virtual machine manager, the packet including an associated virtual time of arrival,
    retrieving an actual time of arrival of the packet from a storage element in which the virtual machine manager recorded the actual time of arrival, and
    replacing the virtual time of arrival with the actual time of arrival;
    wherein retrieving the actual time of arrival comprises performing one of:
      submitting a request to, and receiving a response from the virtual machine manager; and
      accessing the storage element directly.

18. The apparatus of claim 17, wherein the method further comprises maintaining a pointer to a buffer in the storage element, and to retrieve the actual time of arrival from the buffer based on the pointer.

19. The apparatus of claim 18, wherein the buffer is a circular buffer that is managed by the virtual machine manager.

20. The apparatus of claim 17, wherein the method further comprises determining a packet identifier corresponding to the packet, and to retrieve the actual time of arrival based on the packet identifier.

* * * * *